United States Patent
Hirano et al.

(10) Patent No.: US 7,145,746 B1
(45) Date of Patent: Dec. 5, 2006

(54) DISK DRIVE WITH ADAPTIVE CONTROL OF PERIODIC DISTURBANCES

(75) Inventors: Toshiki Hirano, San Jose, CA (US); Fu-Ying Huang, San Jose, CA (US); Tetsuo Semba, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/279,763

(22) Filed: Apr. 14, 2006

(51) Int. Cl.
  *G11B 5/596* (2006.01)
(52) U.S. Cl. ................................. 360/77.04
(58) Field of Classification Search ............... None
  See application file for complete search history.

(56) References Cited

U.S. PATENT DOCUMENTS

| | | |
|---|---|---|
| 2002/0144034 A1 | 10/2002 | Smith |
| 2003/0193736 A1* | 10/2003 | Min et al. ............... 360/77.04 |
| 2004/0193337 A1 | 9/2004 | Yamakawa et al. |

FOREIGN PATENT DOCUMENTS

JP    2000076806    3/2000

OTHER PUBLICATIONS

Tzou et al., "Adaptive Repetitive Control of PWM Inverters for Very Low TH DAC-Voltage Regulation with Unknown Loads", IEEE Trans. on Power Electronics, vol. 14, No. 5, pp. 973-998.

Dotsch et al., "Adaptive Repetitive Control of a Compact Disc Mechanism", Proceedings of the 34th Conference on Decision and Control, TAO5, pp. 1720-1725, 1995.

Katayama et al., "High-Precision Tracking Control System for Digital Video Disk Players", IEEE Trans. on Consumer Electronics, vol. 41, No. 2, pp. 313-321, 1995.

Cao et al., "Adaptive Repetitive Control to Track Variable Periodic Signals With Fixed Sampling Rate", IEEE/ASME Trans. on Mechatronics, vol. 7, No. 3, pp. 378-384, 2002.

* cited by examiner

*Primary Examiner*—Hoa Thi Nguyen
*Assistant Examiner*—Mitchell Slavitt
(74) *Attorney, Agent, or Firm*—Thomas R. Berthold (57) ABSTRACT

A disk drive, such as a magnetic recording hard disk drive, has a head positioning servo control system that includes an improved repetitive controller included with the conventional feedback controller for suppressing periodic disturbances. The repetitive controller includes a low-pass filter (LPF) and a time-delay memory with a time delay matched to the period of the periodic disturbance. In a digital implementation, where the head position error signal (PES) is sampled, the time delay is the time for N samples. A subsequent PES sample is summed with the time-delay input sample from N samples earlier and this summed value is input to the LPF. The output of the LPF is added to the subsequent PES sample and the added value is input to the feedback controller. The value of N is adjustable, so the repetitive controller is adaptable to changes in frequency of the periodic disturbance.

13 Claims, 5 Drawing Sheets

DISK DRIVE WITH ADAPTIVE CONTROL OF PERIODIC DISTURBANCES

BACKGROUND OF THE INVENTION

1. Field of the Invention

This invention relates generally to disk drives, and more particularly to a magnetic recording disk drive that includes a system for substantially suppressing a repetitive or periodic disturbance where the frequency of the disturbance is neither known nor constant.

2. Description of the Related Art

Magnetic recording hard disk drives (HDDs) use an actuator, typically a rotary voice-coil-motor (VCM) actuator, for positioning the read/write heads on the data tracks of the recording disks. The HDD has a servo control system that receives a position error signal (PES) from servo positioning information read by the heads from the data tracks and generates a VCM control signal to maintain the heads on track (track "following") and move them to the desired track (track "seeking") for reading and writing of data.

HDDs experience disturbance forces during normal operation that affect the positioning of the heads on the data tracks. Because HDDs are used in a variety of environments they are also subject to a wide range of external disturbances. For example, in portable music players and audio/video devices that use HDDs, the external disturbance may come from walking or jogging, or from automobile motion. These disturbances are typically low-frequency vibrations that are periodic, i.e., repetitive at regular or predictable intervals, but the frequency is not known. Also, these periodic disturbances typically have a fundamental frequency that is not constant but slowly changing.

There are many known techniques for control of one particular type of periodic disturbance in HDDs, i.e., repeatable disk runout (RRO). However, RRO occurs at the known frequency of disk rotation so there is no need to identify the frequency and no need to address the problem of a periodic disturbance with a changing frequency. The conventional approach to control of RRO and other periodic disturbances, such as the use of a repetitive controller in the servo control system feedback loop, does not work for mobile HDD applications because it requires that the frequency be known and constant.

In addition to RRO, there are other HDD disturbances that exhibit narrow-band frequency characteristics. To compensate for narrow-band disturbances, peak filters are often used in the HDD servo control system, if the frequency of the disturbance is known. However, the frequency of the disturbance may not be known and/or may vary with time. Thus HDDs may have one or more types of disturbance sensors, such as accelerometers and rotational vibration sensors, that provide measurements of the disturbances. The output of these types of sensors is often used for suspending operation of the HDD until the disturbance has subsided, or input to a feedforward controller to create a control signal that compensates for the head's off-track motion caused by the disturbance. However, the output of these sensors can also be used to identify the frequency of the disturbance. In co-pending application Ser. No. 11/349,774 filed Feb. 7, 2006 and assigned to the same assignee as this application, an HDD is described that uses a vibration sensor and an adjustable peak filter coupled to the servo control system. The frequency of the vibration is identified from the sensor output and used to adjust the peak filter frequency up or down, so as to suppress disturbances over a relatively wide range of frequencies.

What is needed is a HDD that includes a system without a vibration sensor to substantially suppress a repetitive or periodic disturbance where the frequency of the disturbance is neither known nor constant.

SUMMARY OF THE INVENTION

The invention is a disk drive, such as a magnetic recording HDD, with a servo control system that includes an improved repetitive controller included with the conventional feedback controller for suppressing periodic disturbances. The repetitive controller includes a time-delay memory and a low-pass filter (LPF) that has a cutoff frequency higher than the highest harmonic frequency of the periodic disturbance. In a digital implementation, where the PES is sampled, the time delay of the time-delay memory is the period of the periodic disturbance and corresponds to the time for N samples. The time-delay memory output sample is the input sample that was received N samples earlier. In operation a subsequent PES sample is summed with the time-delay input sample from N samples earlier and this summed value is input to the LPF. The output of the LPF is added to the subsequent PES sample and the added value is input to the feedback controller.

The time-delay of the time-delay memory is adjustable, so the repetitive controller is adaptable to changes in frequency of the periodic disturbance. The value of N is adjusted, depending on the value in an accumulator. The time-delay memory input sample is multiplied by the time-delay memory input sample that was taken N/4 samples earlier and the product is input to the accumulator. With each input sample to the time-delay memory this product is added to the accumulator. The value in the accumulator represents the error of the time-delay, i.e., the error in the estimate of the period of the disturbance. The servo control system processor regularly queries the accumulator. If the value is positive this indicates that the actual frequency of the periodic disturbance is lower than expected, meaning that the actual period is longer, so N is increased. If the value is negative this indicates that the actual frequency of the periodic disturbance is higher than expected, meaning that the actual period is shorter, so N is decreased.

For a fuller understanding of the nature and advantages of the present invention, reference should be made to the following detailed description taken together with the accompanying figures.

DETAILED DESCRIPTION OF THE INVENTION

Figure 1:
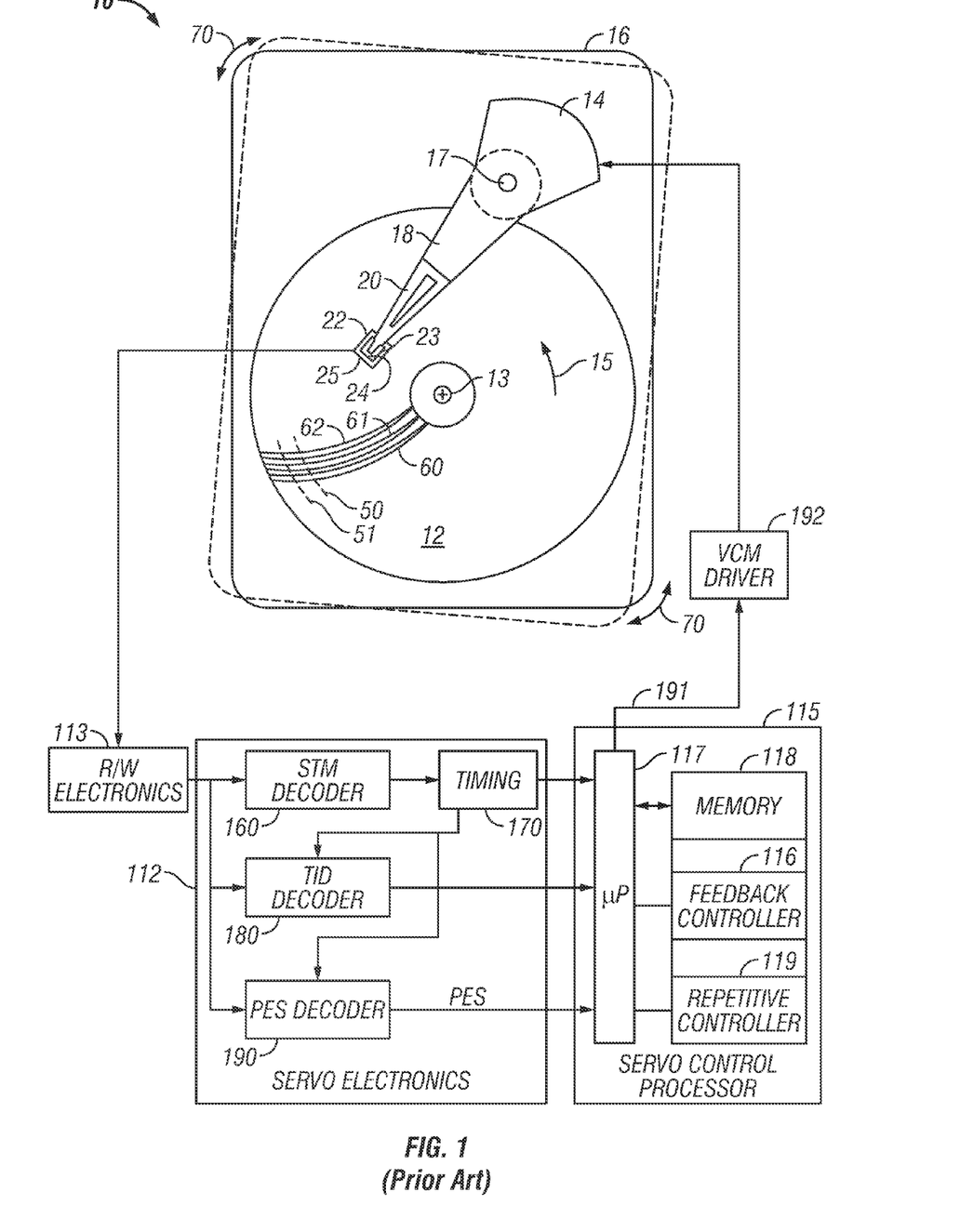
FIG. 1 is a schematic top view of a magnetic recording HDD with a feedback controller and a repetitive controller according to the prior art.

FIG. 1 is a block diagram of a prior art magnetic recording HDD 10. The HDD 10 includes a magnetic recording disk 12 that is rotated about an axis of rotation 13 in direction 15 by a spindle motor (not shown) mounted to the HDD housing or base 16. The disk 12 has a magnetic recording layer patterned into magnetizable blocks that define concentric data tracks, such as typical tracks 50, 51, and servo sectors, such as typical servo sectors 60, 61, 62. The servo sectors extend generally radially across the concentric data tracks so that each data track has a plurality of equally-angularly spaced servo sectors that extend around the track. Each of the servo sectors in a data track contains a servo timing mark (STM) that indicates the start of the servo sector, a track identification (TID) code, and a portion of a pattern of magnetized blocks or high-frequency bursts that are decoded to provide a head position error signal (PES).

HDD 10 also includes a rotary voice coil motor (VCM) actuator 14 supported on the base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write (R/W) head 24 is formed on the trailing surface 25 of slider 22. The flexure 23 and suspension 20 enable the slider to "pitch" and "roll" on an air-bearing generated by the rotating disk 12.

As the disk 12 rotates in the direction 15, the positioning information in the servo sectors is read by the read head and sent to R/W electronics 113. The servo electronics 112 receives input from R/W electronics 113 and provides digital signals to servo control processor 115. The servo control processor 115 provides an output 191 to VCM driver 192 that controls current to the VCM 14 to move the read/write head 24 to the desired data track and maintain it on track for reading and writing of data.

Within the servo electronics 112, the STM decoder 160 receives a clocked data stream from the read/write electronics 113. Once an STM has been detected, an STM found signal is generated. The STM found signal is used to adjust timing circuit 170, which controls the operating sequence for the remainder of the servo sector. After detection of an STM, the track identification (TID) decoder 180 receives timing information from timing circuit 170, reads the clocked data stream, which is typically Gray-code encoded, and then passes the decoded TID information to servo control processor 115. Subsequently, the PES decoder 190 (also called the servo demodulator) captures the position information from read/write electronics 113 and passes PES samples to servo control processor 115.

The servo control processor 115 is a digital signal processor that includes a microprocessor 117 that uses the PES samples as input to a control algorithm to generate the control signal 191 to VCM driver 192. The control algorithm is a program of instructions stored in memory 118 accessible by the microprocessor 117. The control algorithm uses a feedback controller 116, which is a set of parameters stored in memory 118 and based on the static and dynamic characteristics of the "plant" being controlled, i.e., the VCM 14. The control algorithm is essentially a matrix multiplication algorithm, and the controller parameters are coefficients used in the multiplication.

Figure 2A:
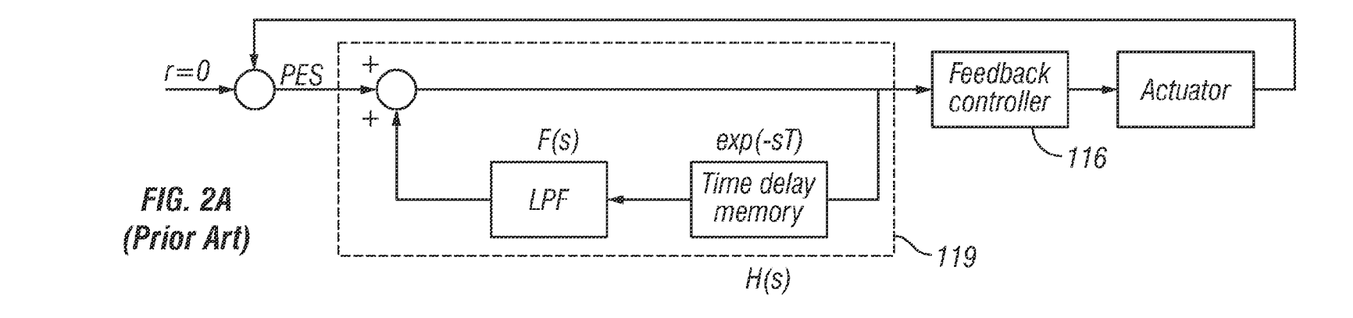
FIG. 2A is a servo control loop for a HDD showing a conventional repetitive controller included with the feedback controller.

The HDD 10 can be subject to a periodic disturbance, as represented schematically by arrows 70, that causes track misregistration (TMR) of the read/write heads. The most common type of periodic disturbance is repeatable runout (RRO) of the disk, which is caused by rotation of the spindle motor and occurs at a known and fixed frequency. To address RRO, the HDD may include a conventional repetitive controller 119, which is a set of program instructions and parameters stored in memory 118. FIG. 2A is a servo control loop for a HDD showing a conventional repetitive controller 119 included with the feedback controller 116. The repetitive controller 119 includes a time-delay memory and a low-pass filter (LPF). The cutoff frequency of the LPF is typically higher than the highest harmonic frequency of the periodic disturbance, so that the fundamental and most significant harmonics of the periodic disturbance are attenuated. H(s) represents the closed-loop transfer function for the repetitive controller as shown in Eq. 1, where F(s) represents the transfer function for the LPF. The time-delay memory has a transfer function exp(–sT), where T is the period of the periodic disturbance expected to have a fixed frequency f=1/T. For a digital system where the PES is sampled, the time delay is N samples, which is the same length as the period T, so N input samples are stored in memory. The input to the LPF is the output of the time-delay memory, which is the time-delay input sample that was received N samples earlier. As shown by Eq. 3, for an example where F(s) is approximately 1, the gain of H(s) is infinite if the frequency of the periodic disturbance is exactly the expected frequency of 1/T. However, as shown by Eq. 4, if the frequency of the periodic disturbance changes to ⅔(1/T), the gain is reduced to ½.

$$\text{Eq. 1: } H(s) = \frac{1}{1 - F(s)\exp(-sT)}$$

$$\text{Eq. 2: } H(s) \cong \frac{1}{1 - \exp(-sT)} = \frac{1}{2\exp(-sT/2)\sin(sT)}, \text{ where } F(s) \cong 1.$$

$$H(s) \to \infty \text{ at } sT = n\pi. \qquad \text{Eq.3:}$$

$$H(s) \to \tfrac{1}{2} \text{ at } sT = (n + \tfrac{1}{2})\pi. \qquad \text{Eq.3:}$$

Figure 2B:
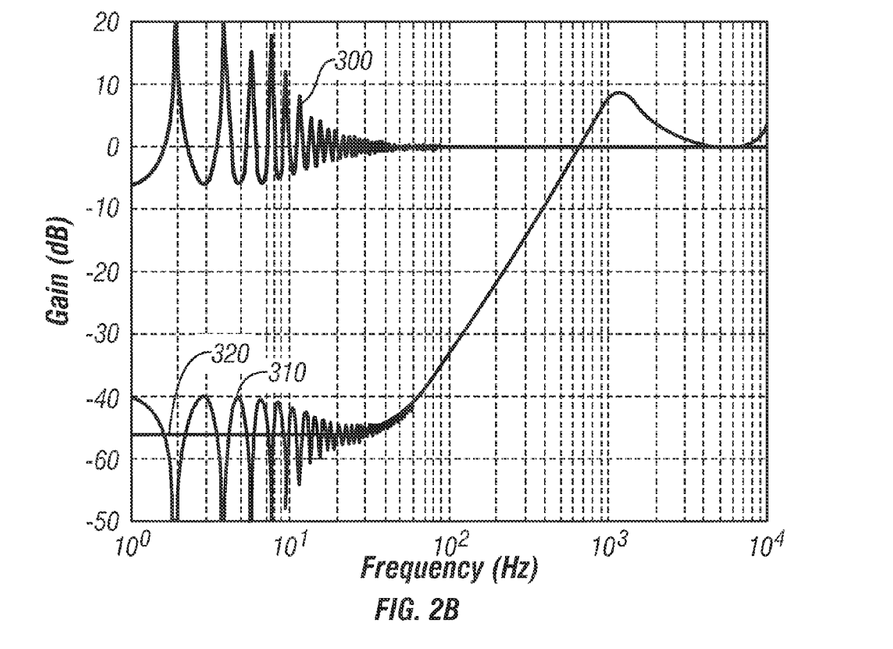
FIG. 2B is a graph of gain as a function of frequency for the prior art system of FIG. 2A, and illustrates the poor suppression of disturbances at frequencies between the harmonics for a periodic disturbance at a fixed fundamental frequency.

FIG. 2B is a graph of gain as a function of frequency for the prior art system of FIG. 2A. The time delay in this example is 1 second, corresponding to a periodic disturbance with a fixed frequency of 1 Hz. Curve 300 is the gain of the transfer function H(s). The peaks in curve 300 occur at the fundamental frequency (2 Hz) and harmonics and show the near infinite gain at these frequencies. Curve 310 is the error rejection with the repetitive controller 119 and curve 320 shows the error rejection without the repetitive controller. As shown by the peaks in curve 310 for frequencies between 0 and about 30 Hz, there is relatively poor disturbance suppression at frequencies between the harmonics. At these frequencies the system without the repetitive controller (curve 320) provides better disturbance suppression. At frequencies above about 30 Hz, there is essentially no difference from a system without the repetitive controller 119, as shown by curve 320.

Figure 3A:
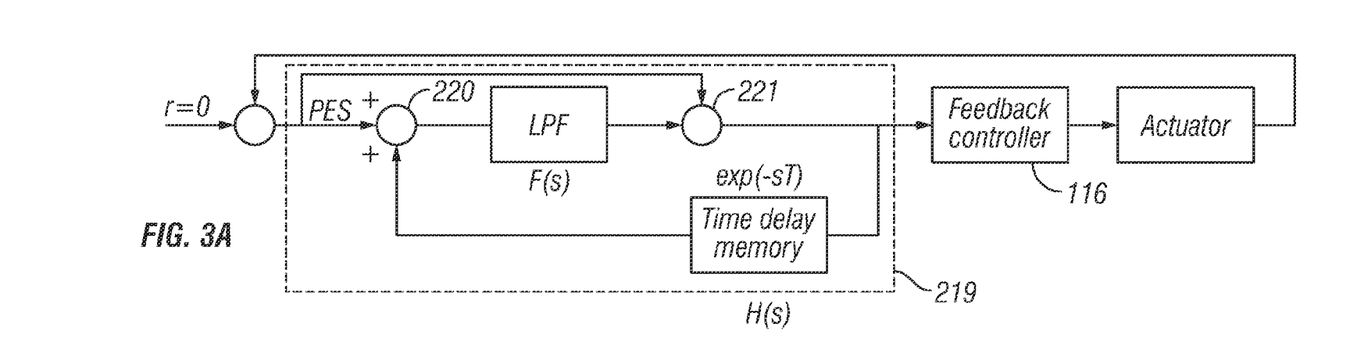
FIG. 3A is a servo control loop for a HDD according to the invention and illustrates the adaptive repetitive controller included with the feedback controller.

FIG. 3A is a servo control loop for an HDD of this invention showing the adaptive repetitive controller 219 included with the feedback controller. H(s) represents the closed-loop transfer function for the adaptive repetitive controller as shown in Eq. 5, where again F(s) represents the transfer function for the LPF. Like the prior art system of FIG. 2A, the time-delay memory has a transfer function exp(−sT), where T is the period of the periodic disturbance expected to have an initial frequency f=1/T. For a digital system where the PES is sampled, the time delay is N samples, which is the same length as the period T, so N input samples are stored in memory. However, in the system of FIG. 3A the input to the LPF is the sum of the PES and the output of the time-delay memory, which is the time-delay input sample that was received N samples earlier. In operation a subsequent PES sample is summed at summing junction 220 with the time-delay input sample from N samples earlier. This summed value is then input to the LPF and the output of the LPF is added to the subsequent PES sample at junction 221 for input to feedback controller 116. As shown by Eq. 7, for an example where F(s) is approximately 1, the gain of H(s) is infinite if the frequency of the periodic disturbance is exactly the initial frequency of 1/T. However, as shown by Eq. 8, if the frequency of the periodic disturbance changes to ⅔(1/T), the gain is reduced to 1, as compared to a reduction to ½ for the prior art repetitive controller of FIG. 2A.

$$\text{Eq. 5: } H(s) = \frac{1 + F(s)}{1 - F(s)\exp(-sT)}$$

$$\text{Eq. 6: } H(s) \cong \frac{2}{1 - \exp(-sT)} = \frac{1}{\exp(-sT/2)\sin(sT)}, \text{ where } F(s) \cong 1.$$

$$H(s) \rightarrow \infty \text{ at } sT = n\pi. \quad \text{Eq.7}$$

$$H(s) \approx 1 \text{ at } sT = (n+\tfrac{1}{2})\pi. \quad \text{Eq.8}$$

Figure 3B:
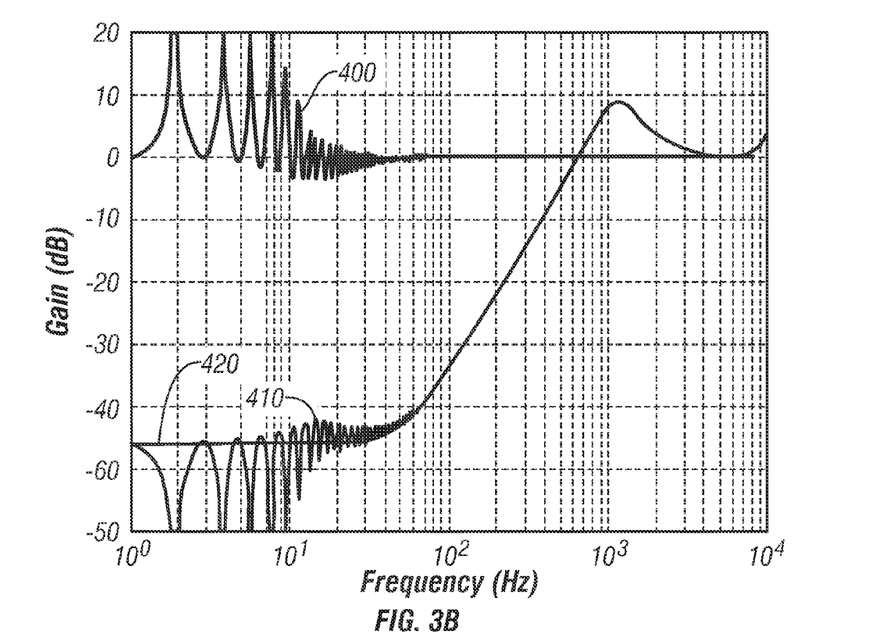
FIG. 3B is a graph of gain as a function of frequency for the system of FIG. 3A, and illustrates the improvement over the system of FIG. 2A in suppression of disturbances at frequencies between the harmonics for a periodic disturbance at a fixed fundamental frequency.

FIG. 3B is a graph of gain as a function of frequency for the system of FIG. 3A. The time delay in this example is 0.5 sec corresponding to a periodic disturbance with a fixed frequency of 2 Hz. Curve 400 is the gain of the transfer function H(s). The peaks in curve 400 occur at the fundamental frequency (2 Hz) and harmonics and show the near infinite gain at these frequencies. Curve 410 is the error rejection with the repetitive controller 219 and curve 420 shows the error rejection without the repetitive controller. As shown by the peaks in curve 410 for frequencies between 0 and about 10 Hz, there is substantially improved disturbance suppression at frequencies between the harmonics as compared to the prior art system shown in FIG. 2B.

The repetitive controller 219 is adaptive, meaning that it is capable of adjusting the time delay T as the fundamental frequency of the periodic disturbance changes. One example of such a periodic disturbance with a relatively slow time-varying fundamental frequency would be the disturbance caused by a runner or walker speeding up or slowing down. Another example would be the disturbance caused by a moving automobile as the road surface and/or speed change.

Figure 4:
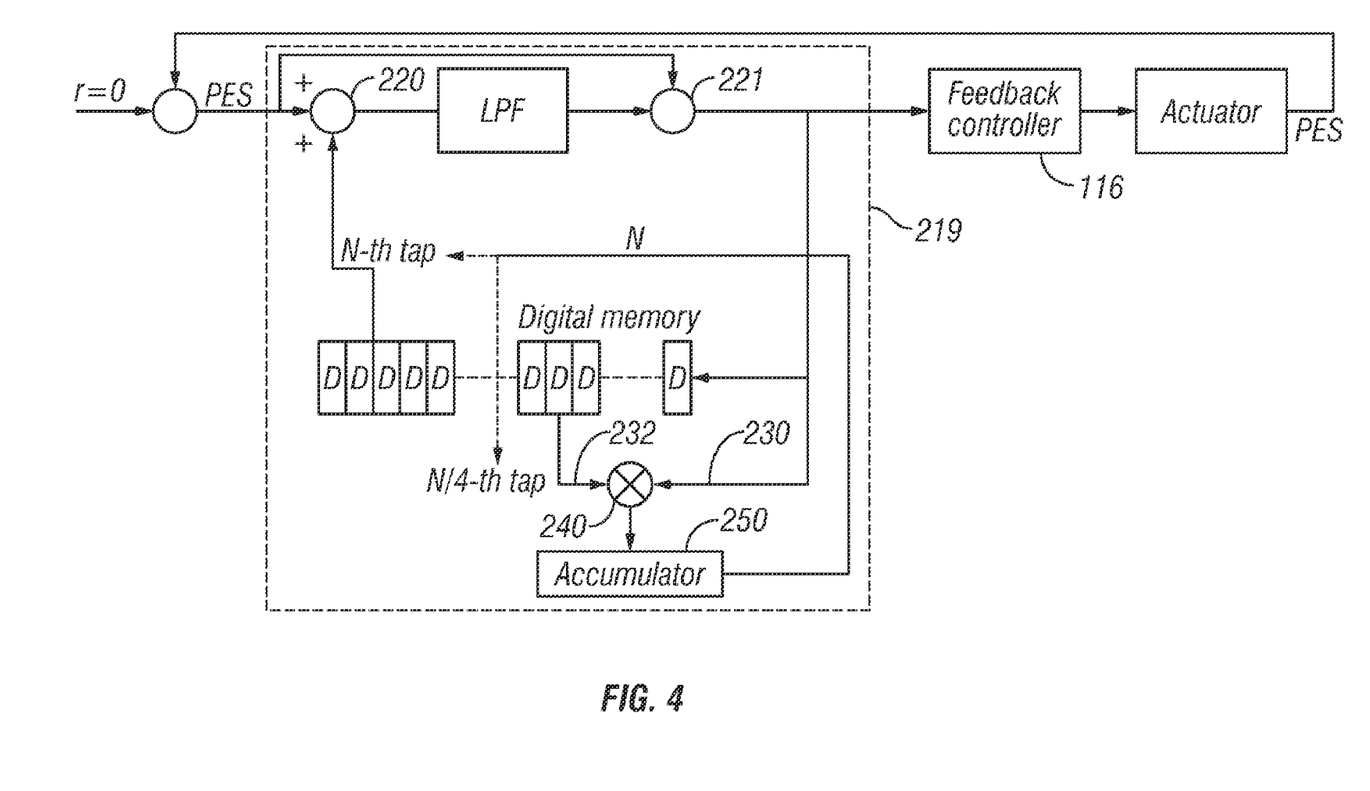
FIG. 4 is a servo control loop for a HDD according to the invention illustrating the method for adjusting the time delay of the adaptive repetitive controller by accumulating the product of the input to the time-delay memory and the output at time T/4, where T is the time delay.

FIG. 4 is a schematic illustrating the adaptive repetitive controller 219 with adjustable time-delay memory, where the time delay is represented as N samples, where N corresponds to the period T of the disturbance. The time delay memory stores N sequential input samples. After N samples have been received it outputs the first sample to summing junction 220. The time delay N is adjustable as the frequency, and thus the period T, of the periodic disturbance changes. As shown in FIG. 4, if the initial period is T, then the length of the time delay memory is N, as shown by connection at the Nth tap. The location of the N-th tap is increased or decreased, thus changing the time delay N, in response to the output of an accumulator 250. The input to accumulator 250 is the output of a multiplier 240. One input to multiplier 240 at line 230 is the sample input to the time delay memory. Another input to multiplier 240 at line 232 is the sample taken N/4 samples earlier, corresponding to ¼th the period T of the periodic disturbance. The product of these two values is input to the accumulator 250. The value in the accumulator represents the error of the time-delay memory, i.e., the error in the estimate of the period of the disturbance. With each input sample to the time-delay memory the multiplier 240 sends its product output to accumulator 250. The accumulator 250 adds each product received to the current value in the accumulator, and depending on the sign of the value in the accumulator either increases or decease the time delay N.

The operation of the adaptive repetitive controller 219 will be further explained by an example. The input at line 230 is a signal w(t) and the input at line 232 is a signal w(t−T/4). The error e in the frequency estimate can be determined from an integration as shown in Eq. 9 below, where the integration represents the accumulator 250.

$$e = \int_0^{T/2} w(t) \times w(t-T/4) dt. \quad \text{Eq.9}$$

When the input signal is w(t)=a sin(2πft+θ), $$e = a^2 \int_0^{T/2} \sin(2\pi ft + \theta)\sin(2\pi ft - 2\pi fT/4 + \theta) dt = \frac{a^2}{4f}\cos(\pi fT/2)$$

When the frequency matches the delay T, f=1/T and the error is e=0.

The frequency can be identified by the sign of e, because e≧0 at 0<f≦1/T, and e<0 at 1/T<f<2/T.

When the input signal has harmonics w(t)=$a_0$ sin(2πft+$θ_0$)+ $a_1$ sin(4πft+$θ_i$), $$e = \frac{a_0^2}{4f}\cos(\pi fT/2) + \frac{a_1^2}{4f}\cos(\pi fT + \theta_0 - \theta_1).$$

When the magnitude of the higher harmonics $a_1$ is smaller or the phase difference between the harmonics is small, the frequency estimation method above is approximately correct. Thus the sign of e, corresponding to whether the contents of accumulator 250 is positive or negative, determines whether to increase or decrease N. In operation, the microprocessor regularly queries the accumulator 250. If the value is positive this indicates that the actual frequency of the periodic disturbance is lower than expected, meaning that the actual period T is longer, so N is increased. If the value is negative this indicates that the actual frequency of the periodic disturbance is higher than expected, meaning that the actual period T is shorter, so N is decreased. An initial value of N is selected, correspond to an initial estimate of an expected period T. For example, an initial value of T=1 second can be selected, corresponding to an initial estimated frequency of 1 Hz. The value of N can then be incremented or decremented by a predetermined amount, for example N/4. Alternatively, different increment or decrement values can be selected depending on the size of the error in the accumulator.

Figure 5A:
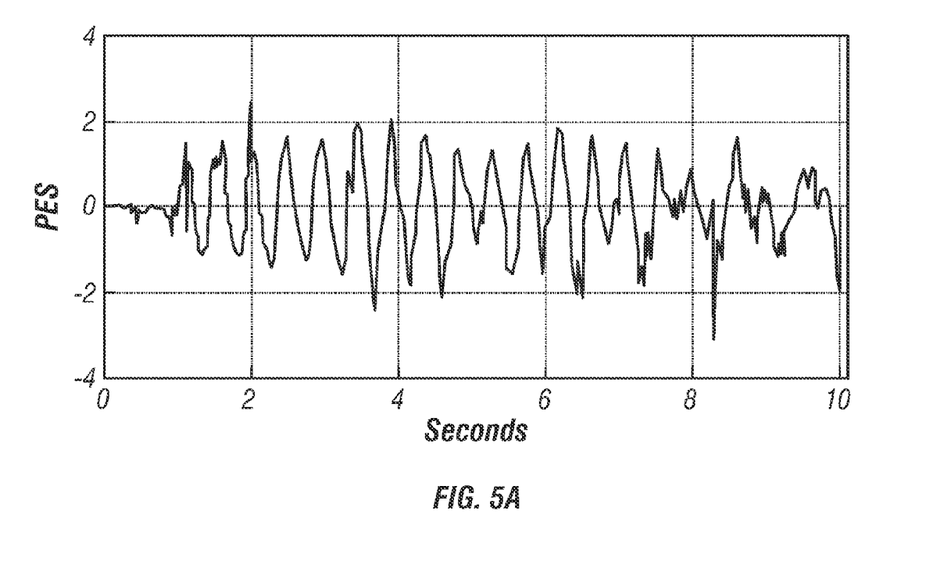
FIG. 5A is a graph of PES as a function of time, for a simulated periodic disturbance caused by walking, for a HDD servo control system with a conventional repetitive controller.
Figure 5B:
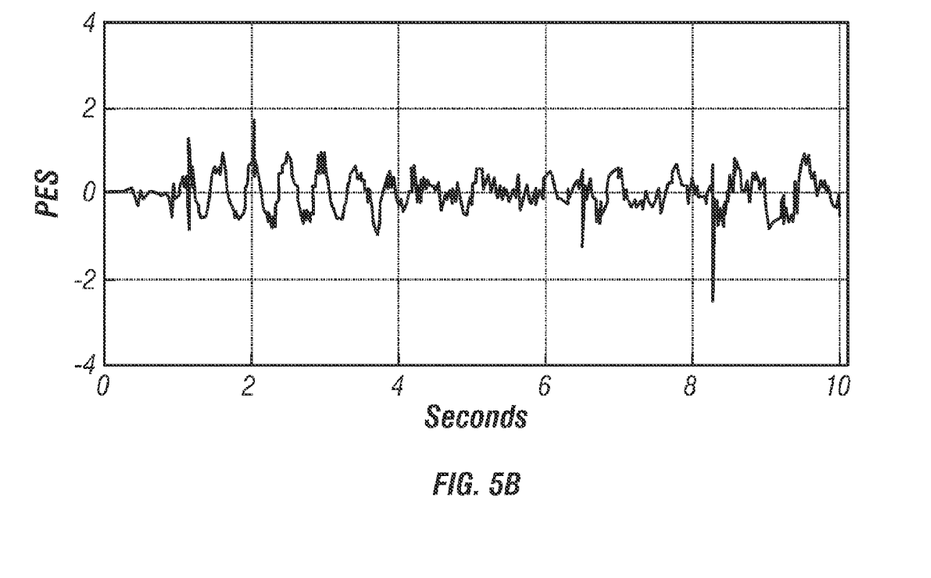
FIG. 5B is a graph of PES as a function of time, for a simulated periodic disturbance caused by walking, for a HDD servo control system according to the invention with the adaptive repetitive controller.

The improvement of the invention over the prior art was demonstrated for a simulated periodic disturbance with changing frequency caused by walking. Over a 10 second time duration the frequency of the simulated disturbance was changing from about 1.78 Hz to about 1.82 Hz. FIG. 5A shows the PES over this 10 second duration for a system with a conventional repetitive controller designed to suppress a periodic disturbance with a fixed frequency of 1.78 Hz. It is only at around 8 seconds that the time delay of the conventional repetitive controller matches the actual period, as shown by a slight decrease in the PES excursion. FIG. 5B shows the PES over this 10 second duration for a system with an adaptive repetitive controller with an initial time delay of 0.5 second to match an initial frequency of 2 Hz. During approximately the first 5 seconds the time delay of the adaptive repetitive controller is being incremented and is converging to the actual period of the disturbance. Beginning at about 5 seconds, the time delay is tracking the change in the period of the disturbance, and the PES excursion is substantially reduced. The improved disturbance suppression is evident from a comparison of the PES amplitudes in FIGS. 5A and 5B.

The invention may be implemented in firmware or software, and stored in a computer-readable storage medium, such as memory associated with the processor, for execution as program steps by the processor. The invention has been described as implemented in a magnetic recording HDD. However, the invention is applicable to other types of disk drives, such as optical disk drives, for example, CD and digital versatile disk (DVD) types of read-only and writable disk drives, that use optical disks and optical read or read/write heads.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive comprising:
   a rotatable disk having a plurality of tracks containing positioning information;
   a head movable across the disk, the head being capable of reading positioning information in the tracks;
   an actuator for moving the head;
   a feedback controller providing a controller output as an actuator input to drive the actuator;
   a feedback loop to feed a head position at an output of the actuator back as an input to the controller to produce a position error signal (PES); and
   a repetitive controller included in the feedback loop for suppressing periodic disturbances, the repetitive controller including an adjustable time-delay memory and a filter, the filter receiving as input the PES and the output of the time-delay memory and providing an output to the feedback controller.

2. The disk drive of claim 1 further comprising an accumulator for accumulating a value representing the error of the time-delay memory.

3. The disk drive of claim 2 wherein the error of the time-delay memory is the product of the input to the time-delay memory and the output of the time-delay memory at a time T/4 earlier than said input, wherein T is the time delay of the time-delay memory and is representative of the estimated period of a periodic disturbance acting on the disk drive.

4. The disk drive of claim 3 wherein zero error represents a time-delay corresponding to an initial frequency of the periodic disturbance, wherein a positive value of accumulated error represents a frequency less than said initial frequency, wherein a negative value of accumulated error represents a frequency greater than said initial frequency, and wherein the time-delay is increased in response to a positive value of accumulated error and decreased in response to a negative value of accumulated error.

5. The disk drive of claim 1 wherein the disk drive is a magnetic recording disk drive.

6. A magnetic recording disk drive including (a) a rotatable magnetic recording disk having a plurality of concentric data tracks containing servo positioning information; (b) a recording head movable across the disk, the head being capable of reading data and servo positioning information in the data tracks; (c) an actuator for moving the head; (d) a processor for receiving a position error signal (PES) from the servo positioning information and for generating an actuator control signal to the actuator; and (e) memory coupled to the processor and containing actuator feedback controller parameters, a time-delay memory, and a program of instructions readable by the processor for substantially suppressing a periodic disturbance acting on the recording head, the program of instructions undertaking the method acts comprising:
   (i) summing the PES with the output of the time-delay memory;
   (ii) low-pass filtering said summed signal to pass the expected frequency of the periodic disturbance;
   (iii) summing the filtered signal with the PES as an input to the time-delay memory;
   (iv) calculating the product of the time-delay memory input and a time-delay memory output received at a time T/4 earlier than said time-delay memory input, wherein T is a time delay representative of the estimated period of a periodic disturbance acting on the disk drive;
   (v) accumulating a series of said calculated products;
   (vi) adjusting the value of delay T in response to the sign of said accumulation; and
   (vii) calculating an actuator control signal using said time-delay memory input and said feedback controller parameters.

7. The disk drive of claim 6 wherein adjusting the value of delay T in response to the sign of said accumulation comprises increasing T when the sign is positive and decreasing T when the sign is negative.

8. The disk drive of claim 6 wherein the PES comprises a series of digital PES samples, wherein the time delay T represents the time to sample N PES samples, wherein the time-delay memory stores N input samples, and wherein the time-delay memory output received at a time T/4 earlier than said time-delay memory input is the time-delay input sample received at time N/4 earlier than said time-delay memory input.

9. A method for suppressing a periodic disturbance in a disk drive, the disk drive including (a) a rotatable disk having a plurality of tracks containing servo positioning information; (b) a head movable across the disk, the head being capable of reading servo positioning information in the tracks; (c) an actuator for moving the head; (d) a processor for receiving digital position error signal (PES) samples from the servo positioning information and for generating an actuator control signal to the actuator; and (e) memory coupled to the processor and containing a time-delay memory and a program of instructions readable by the processor, the program including an actuator feedback controller and a low-pass filter; the processor-implemented method comprising:

storing in the time-delay memory N sequential time-delay memory input samples from sequential PES samples;

summing the value of a subsequent PES sample to the time-delay memory input sample received N samples earlier;

calculating using the low-pass filter a filtered value from said summed value;

adding said filtered value to the value of said subsequent PES sample;

providing said added value as a time-delay memory input sample for storage in the time-delay memory; and calculating an actuator control signal using said added value and said feedback controller.

10. The method of claim 9 wherein the time to receive N PES samples corresponds to the time delay T of the time-delay memory, and wherein T represents the period of the periodic disturbance to be suppressed.

11. The method of claim 10 further comprising adjusting the value of N in response to a change in the period of the periodic disturbance.

12. The method of claim 11 further comprising calculating the product of the time-delay memory input sample and a time-delay memory input sample received at a time N/4 earlier, and accumulating a series of said calculated products; and wherein adjusting the value of N comprises adjusting the value of N in response to the sign of said accumulated value.

13. The method of claim 12 wherein adjusting the value of N comprises increasing N when the sign of said accumulated value is positive and decreasing N when the sign of said accumulated value is negative.

* * * * *